US012737368B2

(12) United States Patent
Mangal et al.

(10) Patent No.: US 12,737,368 B2
(45) Date of Patent: Sep. 15, 2026

(54) HUMAN GUIDED TEXT ATTENTION MECHANISM

(71) Applicant: International Business Machines Corporation, Armonk, NY (US)

(72) Inventors: Prattyush Mangal, London (GB); Lamogha Chiazor, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/940,390

(22) Filed: Nov. 7, 2024

(65) Prior Publication Data

US 2026/0127185 A1 May 7, 2026

(51) Int. Cl.
*G06F 16/2457* (2019.01)

(52) U.S. Cl.
CPC .............................. *G06F 16/24578* (2019.01)

(58) Field of Classification Search
CPC ................................................ G06F 16/24578
See application file for complete search history.

(56) References Cited

U.S. PATENT DOCUMENTS 6,182,068 B1 * 1/2001 Culliss .................. G06F 16/337 707/753
11,995,411 B1 * 5/2024 Qadrud-Din ........... G06N 3/045
12,222,992 B1 * 2/2025 Cetoli ..................... G06F 16/93
2024/0095463 A1 3/2024 Leary et al.
2024/0265205 A1 8/2024 Goligorsky
2025/0077765 A1 * 3/2025 Xu .......................... G06F 40/56
2025/0077777 A1 * 3/2025 Zhang ..................... G06F 40/30
2025/0111202 A1 * 4/2025 Ghaeini ............... G06N 3/0455
2025/0124340 A1 * 4/2025 Ni .......................... G06N 20/00
2025/0173363 A1 * 5/2025 Madisetti .............. G06F 40/284
2025/0190454 A1 * 6/2025 Patil ..................... G06F 16/3326
2025/0217371 A1 * 7/2025 Hamid .................. G06F 40/174
2025/0291863 A1 * 9/2025 Ho ...................... G06F 16/9538

OTHER PUBLICATIONS

"Generative AI Market Report 2022 to 2027 Booming Worldwide with Top Players—Synthesia, Mostly Ai, Genie Ai", Stratagem Market Insights, Mar. 2, 2022, 1 page.
"Welcome to Ecco", retrieved from web https://ecco.readthedocs.io/en/main/, dated Dec. 18, 2024, 2 pages.
Alammar Jay. "Interfaces for Explaining Transformer Language Models", retrieved from web https://jalammar.github.io/explaining-transformers/, dated Dec. 18, 2024, 18 pages.

(Continued)

*Primary Examiner* — Jensen Hu
(74) *Attorney, Agent, or Firm* — Amin, Turocy & Watson, LLP

(57) ABSTRACT

A system includes a processor that executes computer executable components stored in a memory. The computer executable components include a segmentation component that segments a prompt into select groups as a function of saliency estimates. The computer executable components further include a ranking component that assigns a rank to at least one of the groups, and a search component that searches for a likely candidate token, based at least in part on the assigned rank.

20 Claims, 9 Drawing Sheets

(56) References Cited

OTHER PUBLICATIONS

Feng et al. Unveiling and Manipulating Prompt Influence in Large Language Models, arXiv:2405.11891v1 [cs.CL], May 20, 2024, 24 pages.
Leviathan et al. "Fast Inference from Transformers via Speculative Decoding", arXiv:2211.17192 [cs.LG], May 18, 2023, 13 pages.
Zhang et al. "User-guided Hierarchical Attention Network for Multi-modal Social Image Popularity Prediction", Track: Web Content Analysis, Semantics and Knowledge, Apr. 23-27, 2018, pp. 1277-1286.

* cited by examiner

200

HUMAN GUIDED TEXT ATTENTION SYSTEM

SEGMENTATION COMPONENT 102

RANKING COMPONENT 106

SEARCH COMPONENT 110

ARTIFICIAL INTELLIGENCE COMPONENT 214

BUS 212

MEMORY 104

PROCESSOR 108

SELECTION COMPONENT 212

COMPUTER 901

PROCESSOR SET 910

PROCESSING CIRCUITRY 920

CACHE 921

COMMUNICATION FABRIC 911

VOLATILE MEMORY 912

PERSISTENT STORAGE 913

OPERATING SYSTEM 922

HUMAN GUIDED TEXT ATTENTION CODE

980

PERIPHERAL DEVICE SET 914

UI DEVICE SET 923

STORAGE 924

IoT SENSOR SET 925

NETWORK MODULE 915

END USER DEVICE 903

REMOTE SERVER 904

REMOTE DATABASE 930

WAN 902

PRIVATE CLOUD 906

GATEWAY 940

PUBLIC CLOUD 905

CLOUD ORCHESTRATION MODULE 941

HOST PHYSICAL MACHINE SET 942

VIRTUAL MACHINE SET 943

CONTAINER SET 944

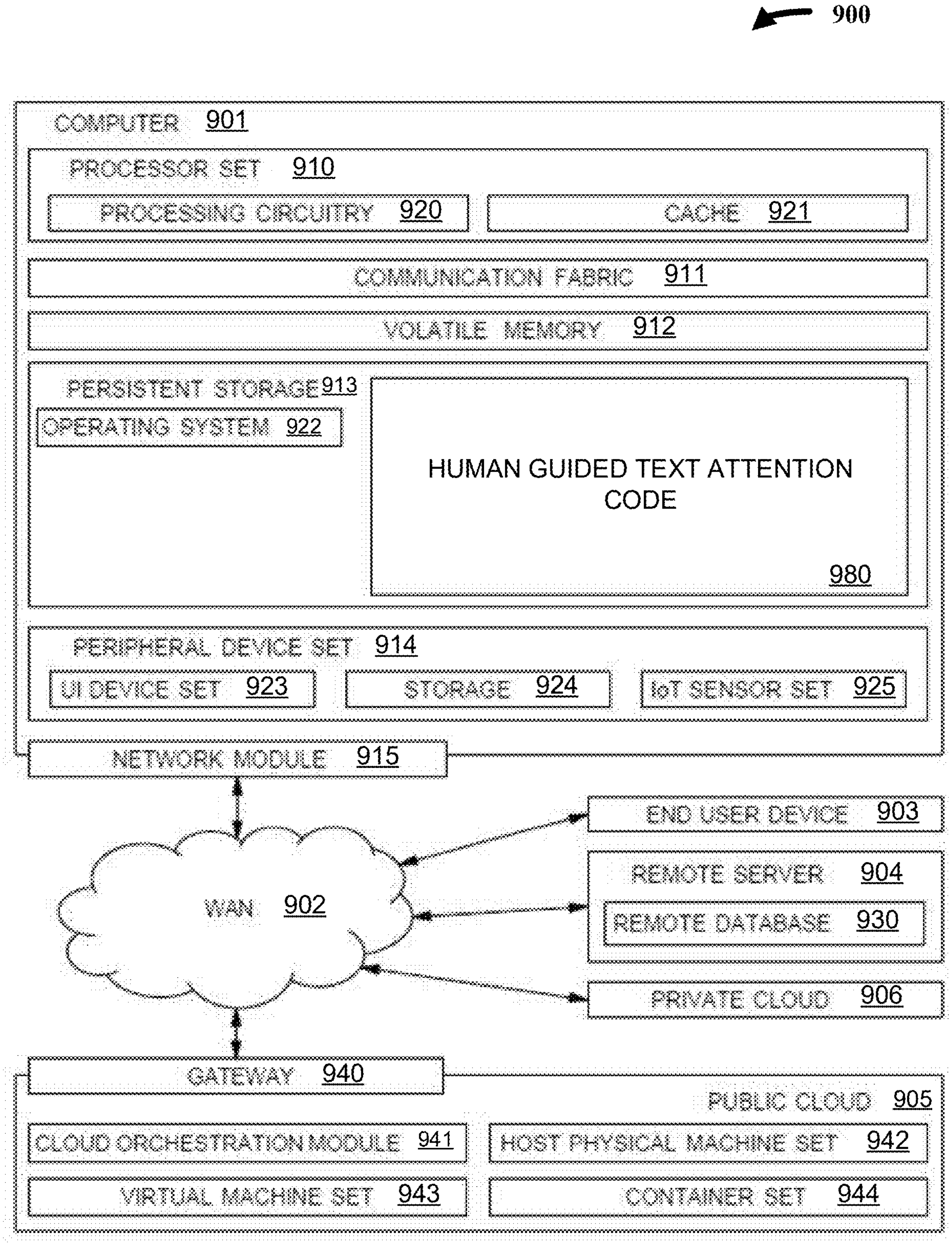

FIG. 9

HUMAN GUIDED TEXT ATTENTION MECHANISM

BACKGROUND

The subject disclosure relates to text generation, e.g., human guided decoding strategies for LLMs.

The field of prompting foundation models, particularly large language models (LLMs), has advanced rapidly. However, current systems continue to exhibit significant limitations in how they interpret and attend to various regions of a prompt. LLMs rely on complex attention mechanisms that distribute focus across different parts of an input to generate an output. However, these mechanisms often apply attention in ways that are misaligned with human preferences. In many cases, certain regions of the input receive disproportionate attention, leading to skewed or unintended results. For instance, a prompt might contain critical information in a specific segment that a user expects the model to prioritize, but the model can instead emphasize irrelevant sections, producing suboptimal outcomes.

Humans intuitively understand the relative importance of different components within a prompt. They can easily identify which parts should be emphasized to better guide the model's response. Despite this, current models do not effectively leverage human capability. Popular decoding strategies such as beam search, top-k sampling, and nucleus sampling operate purely on statistical patterns learned during training; they fail to consider user attention allocation. This creates a disconnect between what the model prioritizes during generation and what the user intends. As a result, generated content often misses the mark in terms of accuracy, relevance, or tone, necessitating multiple iterations of prompt refinement to achieve desired outcomes.

The lack of mechanisms to incorporate human preferences in prompt weighting exposes a fundamental gap in current LLM architectures. While models are becoming increasingly adept at understanding context and generating high-quality text, their inability to be guided by user-directed attention limits their utility by placing the burden on the user to craft precise and effective queries. Thus, current LLM architectures are inefficient and unduly increase the cognitive load required to interpret queries.

SUMMARY

The following presents a summary to provide a basic understanding of some embodiments of the invention. This summary is not intended to identify key or critical elements or delineate any scope of the particular embodiments or any scope of the claims. Its sole purpose is to present concepts in a simplified form as a prelude to the more detailed description that is presented later. In some embodiments described herein, systems, computer-implemented methods, and/or computer program products that facilitate automated creation of data protection workflow for containerized applications are provided.

According to an embodiment, a system can comprise a processor that executes computer executable components stored in memory. The computer executable components can comprise a segmentation component that segments a prompt into select groups as a function of saliency estimates. The computer executable components can further comprise a ranking component that assigns a rank to at least one of the groups, and a search component that searches for a likely candidate token, based at least in part on the assigned rank.

According to another embodiment, a computer-implemented method can comprise segmenting, by a system operatively coupled to a processor, a prompt into select groups as a function of saliency estimates. The computer-implemented method can further comprise assigning, by a system, a rank to at least one of the groups. The computer-implemented method further comprises searching, by a system, for a likely candidate token, based at least in part on the assigned rank.

According to another embodiment, a computer program product comprising a computer readable storage medium having program instructions embodied therewith, the program instructions executable by a processor to cause the processor to segment, by the processor, a prompt into select groups as a function of saliency estimates. The program instructions can also cause the processor to assign, by the processor, a rank to at least one of the groups. The program instructions can also cause the processor to search, by the processor, for a likely candidate token, based at least in part on the assigned rank.

BRIEF DESCRIPTION OF THE DRAWINGS

Next.

FIG. 9 illustrates a block diagram of an example computing environment in which some embodiments described herein can be facilitated.

DETAILED DESCRIPTION

Figure 1:
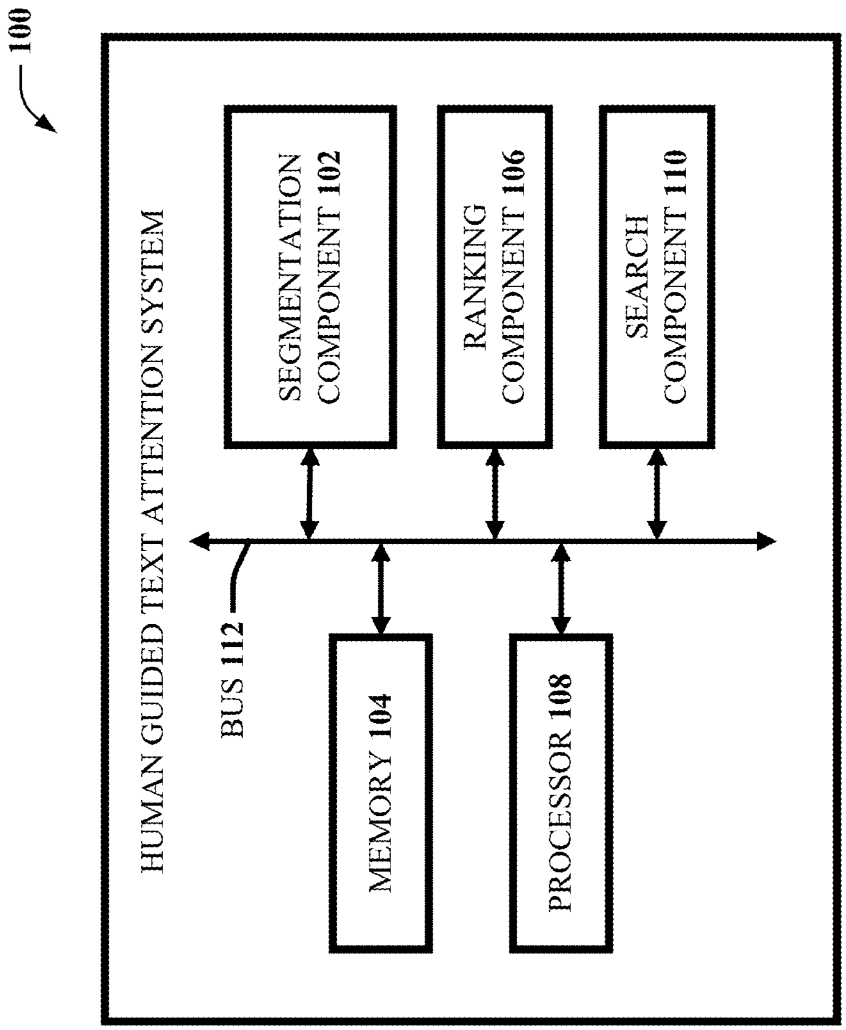
FIGS. 1 and 2 illustrate example systems that can facilitate human guided decoding strategies for LLMs in accordance with some embodiments described herein.

The following detailed description is merely illustrative and is not intended to limit embodiments, applications, and/or uses of embodiments. Furthermore, there is no intention to be bound by any expressed or implied information presented in the preceding Background or Summary sections, or in the Detailed Description section.

The evolution of foundation models, particularly LLMs, has seen remarkable progress in recent years. These models, such as GPT and others, rely on intricate attention mechanisms to distribute focus across various regions of a given prompt. Attention mechanisms, a core part of transformer-based architectures, play a crucial role in how LLMs determine which portions of the input are most relevant to the task at hand. This dynamic allocation of attention enables models to generate coherent and contextually appropriate responses.

However, despite their sophistication, current attention mechanisms frequently exhibit a misalignment with human expectations regarding which parts of a prompt should be prioritized. For example, in a complex prompt containing both relevant and peripheral information, LLMs can distribute attention in ways that skew the output toward less important sections, producing responses that do not adequately address the user's needs or intentions. This misalignment is particularly problematic when critical information is located in regions of the prompt that the user expects the model to prioritize. In such cases, the model can focus on less relevant sections, yielding suboptimal or even inaccurate results.

Humans inherently understand the relative importance of different components of the prompts they craft. When preparing a query or instruction, users intuitively prioritize certain information to guide the response in the desired direction. Unfortunately, current LLMs, despite their advanced language understanding capabilities, fail to effectively leverage this human intuition. Common decoding strategies such as beam search, top-k sampling, and nucleus sampling are designed to select the most likely words or phrases based on a model's learned statistical patterns but fail to consider any explicit user-directed emphasis on certain parts of the input. Such methods are purely probabilistic and focus on language patterns from training data rather than dynamic, real-time user input. As a result, there is often a disconnect between user intent and the model output.

The absence of a mechanism for incorporating user preferences in attention distribution is a significant limitation in current LLM architectures, forcing users to shoulder the burden of optimizing prompts through trial and error, which can be both time-consuming and cognitively demanding. Users are left to navigate the complexities of prompt engineering without the ability to directly guide a model's attention where it matters most. Addressing this gap in current LLM systems would significantly improve user experience and would lead to outputs that are more aligned with original user intent.

In relation to human guided decoding strategies for LLMs, embodiments of the present disclosure produce a solution to one or more of these problems. These embodiments can solve such problems by segmenting a prompt into select groups as a function of saliency estimates, assigning a rank to at least one of the groups, and searching for a likely candidate token, based at least in part on the assigned rank.

One or more systems, devices, computer program products, and/or computer-implemented methods provided herein relate to human guided decoding strategies for LLMs. A system can include a processor that executes computer executable components stored in memory. The computer executable components can comprise segmentation component that segments a prompt into select groups as a function of saliency estimates. The computer executable components can further comprise a ranking component that assigns a rank to at least one of the groups, and a search component that searches for a likely candidate token, based at least in part on the assigned rank.

In some embodiments, the system can further comprise a selection component that determines difference between the assigned rank and a set of annotated ranks, and selects the most likely candidate token, based at least in part on closeness to the set of annotated ranks. The search component can perform a first search based upon the received prompt and performs a second search based upon the assigned rank, and the selection component can select a most likely candidate token based at least in part on results of the first and second searches.

In some embodiments, the system can further comprise an artificial intelligence component that trains an artificial intelligence model to calculate grouped saliences for candidate tokens. The artificial intelligence component can rank the saliences based on a distance to a desired saliency decomposition. The artificial intelligence component can use the distance to the desired saliency decomposition to determine a saliency cost. The artificial intelligence component can optimize similarities between the grouped saliencies and the at least one assigned rank.

In some embodiments of the system, the rank assigned by the ranking component determines a desired saliency decomposition. According to some embodiments, the rank assigned by the ranking component can determine a priority of the segmented groups.

In some embodiments, the ranking component adjusts the at least one rank and the search component performs a new search for a likely candidate based on the adjusted rank.

Advantages of this system can include enhanced user control and improved he fidelity and relevance of generated text in response to a user query.

Some embodiments of the present disclosure are now described with reference to the drawings. In the drawings, like referenced numerals are used to refer to like elements throughout. In the following description, for purposes of explanation, numerous specific details are set forth in order to provide a more thorough understanding of the embodiments. In various cases, some embodiments can be practiced without these specific details, yet a person having ordinary skill in the art will recognize that such embodiments are within metes and bounds of this disclosure.

FIG. 1 illustrates an example system 100 for facilitating human guided decoding strategies for LLMs. The system 100 uses a segmentation component, a ranking component, and a search component. The segmentation component segments a prompt into select groups as a function of saliency estimates. The ranking component assigns a rank to at least one of the groups. The search component searches for a likely candidate token, based at least in part on the assigned rank.

Aspects of systems (e.g., systems 100, 200, and the like), apparatuses, or processes in various embodiments of the present disclosure can constitute one or more machine-executable components embodied within one or more machines. For example, the components can be embodied in one or more computer readable mediums (or media) associated with one or more machines. Such components, when executed by the one or more machines (e.g., computers, computing devices, virtual machines, etc.) can cause the machines to perform the operations described. System 100 can comprise a segmentation component 102, a memory 104, a ranking component 106, a processor 108, a search component 110, and a system bus 112.

The system 100 and/or the components of the system 100 can use hardware and/or software to solve problems that are highly technical in nature. The system 100 solves problems that are not abstract and that cannot be performed as a set of mental acts by a human. Further, some of the processes can be performed by specialized computers for carrying out defined tasks related to recovery plan development. The system 100 and/or components of the system 100 can be employed to solve new problems that arise through advancements in technologies. The system 100 can provide technical improvements to human guided decoding strategies for LLMs by enhancing user control and improving fidelity and relevance of generated text in response to user queries.

The system 100 can include a processor 108. In some embodiments, the processor 108 can execute a component or subcomponent associated with the system 100. Components or subcomponents associated with the system 100 can include one or more machine readable, writable, and/or executable instructions. In some embodiments, the system 100 can include a memory 104, and the memory 104 can store one or more components and/or subcomponents associated with the system 100. In some embodiments, the processor 108 can execute a component stored in the memory 104.

In some embodiments, the system 100 can include a computer-readable memory 104 that can be operably connected to the processor 108. The memory 104 can store computer-executable instructions that, upon execution by the processor 108, can cause the processor 108 and/or one or more other components of the system 100 (e.g., the segmentation component 102, the ranking component 106, and/or the search component 110) to perform one or more actions. In some embodiments, the memory 104 can store computer-executable components (e.g., the segmentation component 102, the ranking component 106, and/or the search component 110).

The system 100 and/or a component thereof as described herein can be communicatively, electrically, operatively, optically, and/or otherwise coupled to one another via a bus 112. The bus 112 can include one or more of a memory bus, memory controller, peripheral bus, external bus, local bus, and/or another type of bus that can employ one or more bus architectures. In some embodiments, the system 100 can be coupled (e.g., communicatively, electrically, operatively, optically, and/or the like) to one or more external systems (e.g., an electrical output production system, one or more output targets, an output target controller, and/or the like). In some embodiments, the system 100 can be coupled to one or more external sources, and/or devices (e.g., classical computing devices, communication devices, and/or like devices), such as via a network. In some embodiments, one or more of the components of the system 100 can reside in the cloud and/or locally in a local computing environment (e.g., at one or more specified locations).

In addition to the processor 108 and/or the memory 104 described above, the system 100 can include one or more computer and/or machine readable, writable, and/or executable components and/or instructions. When executed by the processor 108, these components and/or instructions can enable performance of one or more operations defined by the component(s) and/or instruction(s).

In various embodiments, the segmentation component 102 segments a prompt into select groups as a function of saliency estimates.

According to some embodiments, the ranking component 106 assigns a rank to at least one of the groups. The rank assigned by the rank component 106 can determine a desired saliency decomposition. The rank assigned by the rank component 106 can determine a priority of the segmented groups. In some embodiments, the ranking component can adjust the at least one rank and the search component 110 can perform a new search for a likely candidate based on the adjusted rank.

In various embodiments, the search component 110 searches for a likely candidate token, based at least in part on the assigned rank. In some embodiments, in response to the ranking component adjusting the at least one rank, the search component 110 can perform a new search for a likely candidate, based on the adjusted rank.

Figure 2:
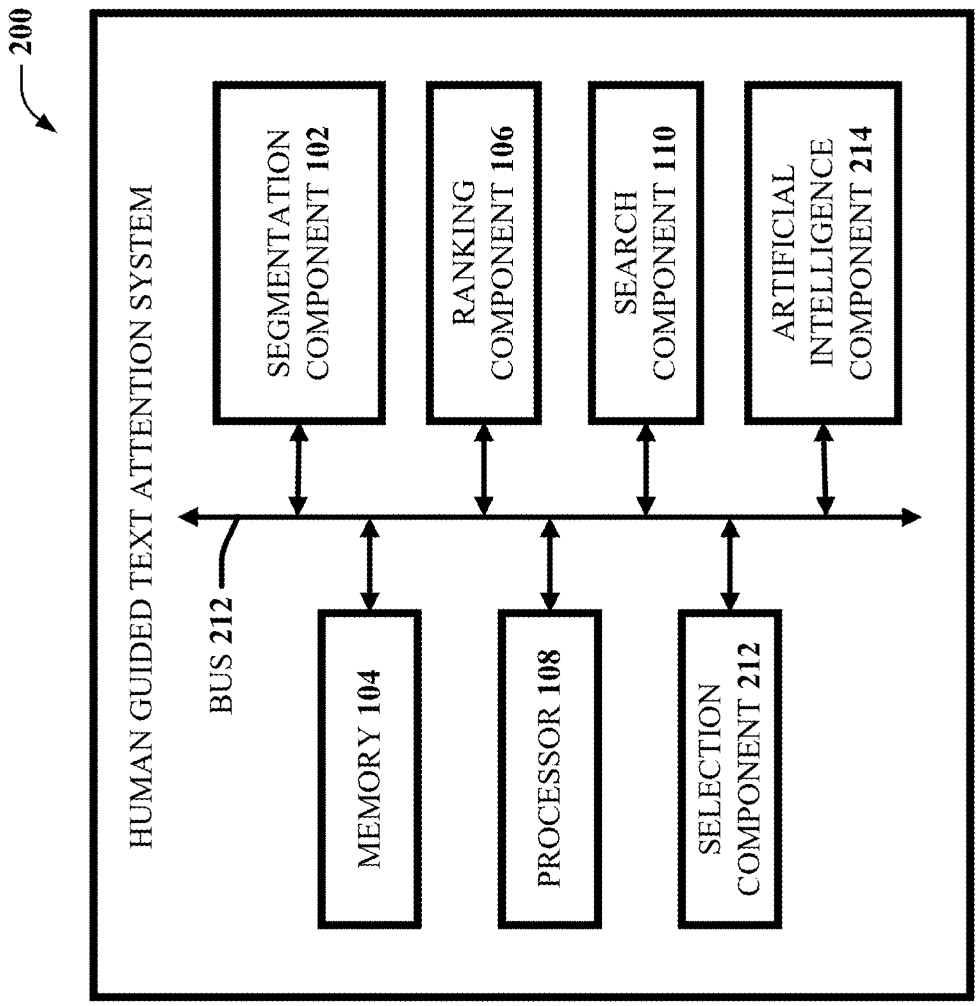

FIG. 2 illustrates an example system 200 that can facilitate human guided decoding strategies for LLMs. The system 200 uses a segmentation component, a ranking component, a search component, a selection component and an artificial intelligence component.

The system 200 can also include a memory 204, a processor 208, and a system bus 212. Description of like components has been omitted for the sake of brevity.

In various embodiments, the selection component 212 can determine difference between the assigned rank and a set of annotated ranks, and select the most likely candidate token, based at least in part on closeness to the set of annotated ranks. Upon search component 110 performing a first search based upon the received prompt, and performing a second search based upon the assigned rank, the selection component 212 can select the most likely candidate token based at least in part on results of the first and second searches.

In various embodiments, the artificial intelligence component 214 trains an artificial intelligence model to calculate grouped saliences for candidate tokens. The artificial intelligence component 214 can rank the saliences based on a distance to a desired saliency decomposition. The artificial intelligence component 214 can use the distance to the desired saliency decomposition to determine a saliency cost. The artificial intelligence component 214 can optimize similarities between the grouped saliencies and the at least one assigned rank.

The systems and/or devices are described herein with respect to interaction between one or more components. Such systems and/or components can include the components and/or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity but known by those of skill in the art.

Figure 3:
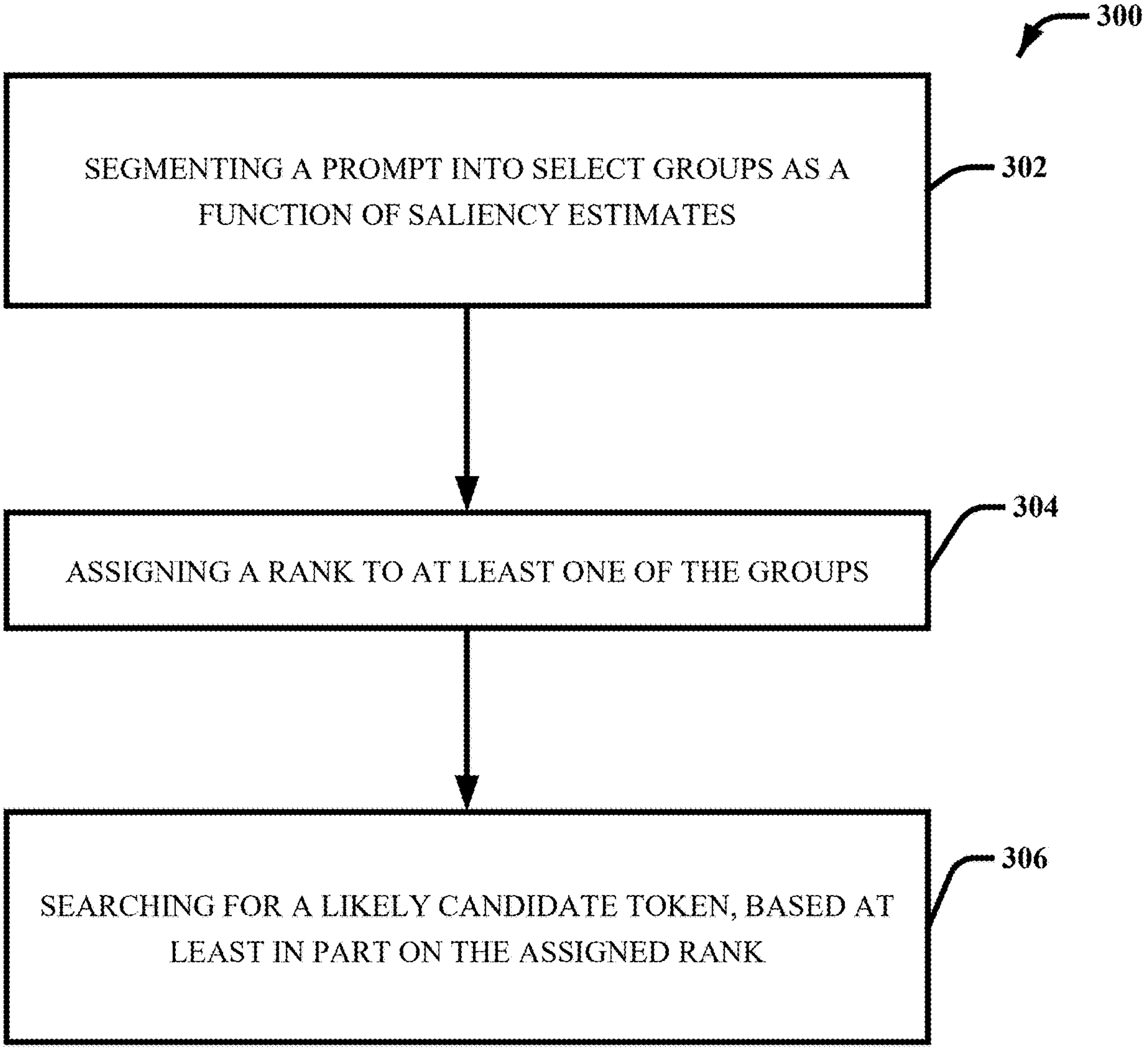
FIGS. 3-7 illustrate example computer-implemented methods that can facilitate human guided decoding strategies for LLMs in accordance with some embodiments described herein.

FIG. 3 illustrates an example computer-implemented method 300 that can facilitate human guided decoding strategies for LLMs in accordance with some embodiments described herein, such as with the system 200 of FIG. 2 or the system 100 of FIG. 1.

For simplicity of explanation, the computer-implemented methods provided herein are depicted and/or described as a series of actions. It is to be understood that the subject matter is not limited by the actions illustrated and/or by the order thereof. For example, actions can occur in one or more orders, concurrently, and/or with other acts not presented and described herein. Furthermore, not all illustrated actions can be utilized to implement the computer-implemented methods in accordance with the described subject matter. In addition, the computer-implemented methods could alternatively be represented as a series of interrelated states via a state diagram or events. Additionally, the computer-implemented methods described in this specification are capable of being stored on an article of manufacture to facilitate transporting and transferring the computer-implemented methods to computers. The term article of manufacture, as used herein, encompasses a computer program accessible from any computer-readable device or storage media.

While the method 300 is described relative to the system 200 of FIG. 2, the method 300 can be applicable also to other systems described herein. Repetitive description of like elements and/or processes employed in respective embodiments is omitted for sake of brevity.

At 302 the method 300 includes segmenting a prompt into saliency estimates. The method 300 can use a system operatively coupled to the processor (e.g., segmentation component 102) to segment the prompt into saliency estimates.

At 304, the method 300 includes assigning a rank to at least one of the groups. A system (e.g., ranking component 106) can assign the rank.

At 306, the method 300 includes searching for a likely candidate token, based at least in part on the assigned rank. A system (e.g., search component 110) can search for a likely candidate token.

Figure 4:
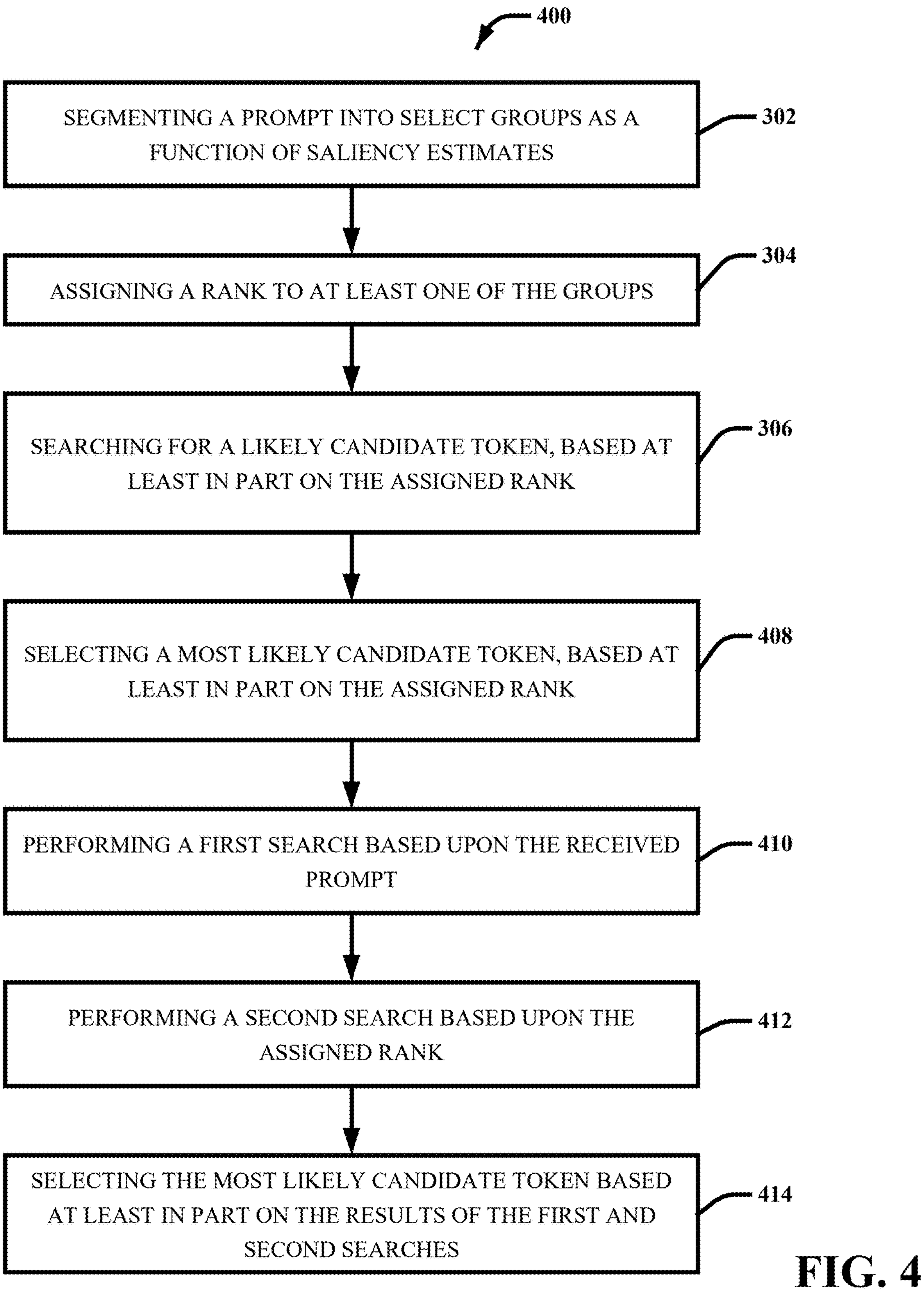

Next, FIG. 4 illustrates an example computer-implemented method 400 that can facilitate human guided decoding strategies for LLMs in accordance with some embodiments described herein, such as with the system 200 of FIG. 2 or the system 100 of FIG. 1. While the method 400 is described relative to the system 200 of FIG. 2, the method 400 can be applicable also to other systems described herein. Repetitive description of like elements and/or processes employed in respective embodiments is omitted for sake of brevity.

At 408, the method 400 includes selecting a most likely candidate token, based at least in part on the assigned rank. A system (e.g., selection component 212) can select a most likely candidate token.

At 410, the method 400 includes performing a first search based upon the received prompt. A system (e.g., search component 110) can perform the first search.

At 412, the method 400 includes performing a second search based upon the assigned rank. A system (e.g., search component 110) can perform the second search.

At 414, the method 400 includes selecting a most likely candidate token, based at least in part on the results of the first and second searches. A system (e.g., selection component 212) can select a most likely candidate token.

In various embodiments, the method 400 can include training a large language model to calculate grouped saliences for candidate tokens. In some embodiments, the ranking of the saliences can be based on a distance to a desired saliency decomposition. According to some embodiments, the method 400 can include using the distance to the desired saliency decomposition to determine a saliency cost. In some embodiments, the method 400 can include determining a desired saliency decomposition, based at least in part on the assigned rank. In various embodiments, assigning the rank determines a priority of the segmented groups. In some embodiments, the method 400 can include adjusting the at least one rank and performing a new search for a likely candidate based on the adjusted rank.

Figure 5:
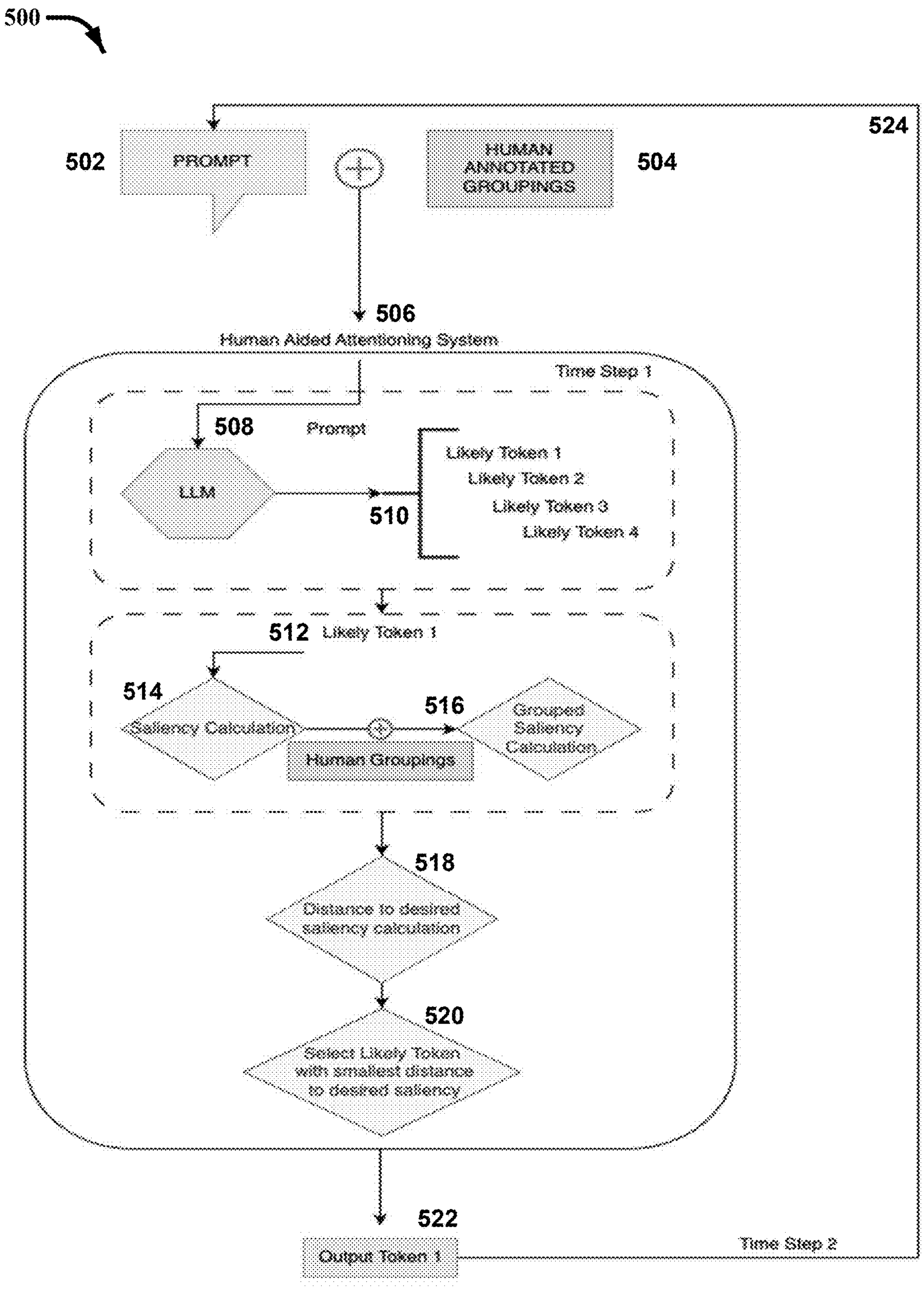

Next, FIG. 5 illustrates a an example computer-implemented method 500 that can facilitate human guided decoding strategies for LLMs in accordance with some embodiments described herein, such as with the system 200 of FIG. 2 or the system 100 of FIG. 1. While the method 500 is described relative to the system 200 of FIG. 2, the method 500 can be applicable also to other systems described herein. Repetitive description of like elements and/or processes employed in respective embodiments is omitted for sake of brevity.

At 502, the method 500 includes providing an input prompt. The method 500 can use a system operatively coupled to the processor (e.g., segmentation component 102) to provide or to receive the prompt. At 504, the method 500 includes receiving human annotated groups of the input prompt. The method 500 can use a system operatively coupled to the processor (e.g., segmentation component 102) to provide or to receive the human annotated groups of the input prompt. At 506, the method 500 includes providing the input prompt and human annotated groupings to a human aided attention system (e.g., the system 100 of FIG. 1 or the system 200 of FIG. 2). At 508, the method 500 includes providing the input prompt to a large language model. At 510, the method 500 includes determining likely candidate tokens from the input prompt. At 512, the method includes selecting a first likely candidate token. At 514, the method 500 includes determining a saliency estimate of the first likely candidate token. At 516, the method 500 includes using the human annotated groupings and the saliency estimate of the first likely candidate token to calculate a grouped saliency. At 516, the method 500 includes determining a distance to a desired saliency calculation. At 518, the method 500 includes selecting a token with a smallest distance to the calculated desired saliency. At 520, the method includes outputting the selected token. At 524, the method includes returning to 502 and receiving a new prompt. In some embodiments, the method 500 is performed by a system such as system 100 of FIG. 1 or system 200 of FIG. 2.

Figure 6:
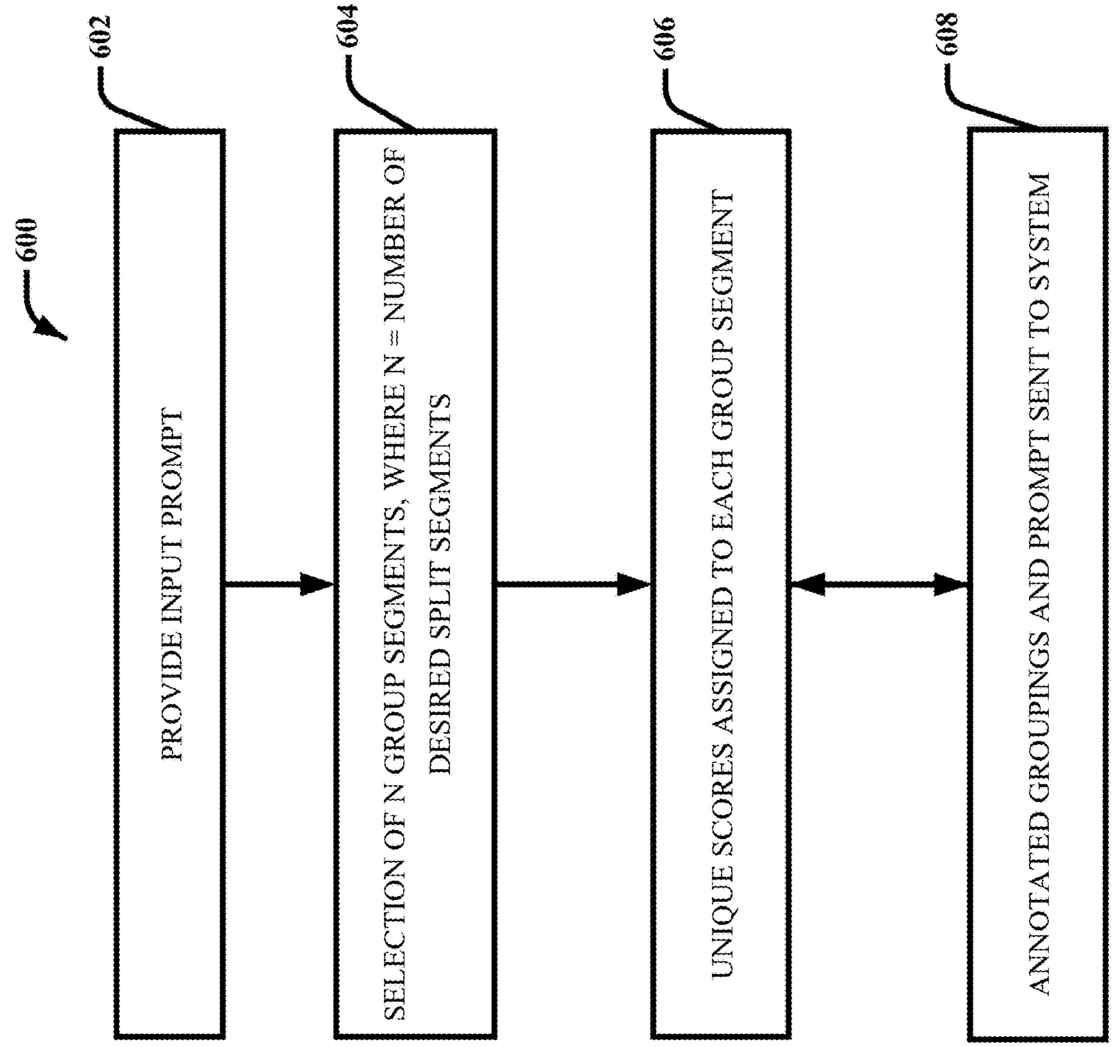

Next, FIG. 6 illustrates a flow diagram of a method 600 that can facilitate human guided decoding strategies for LLMs in accordance with some embodiments described herein, such as with the system 200 of FIG. 2 or the system 100 of FIG. 1. While the method 600 is described relative to the system 200 of FIG. 2, the method 600 can be applicable also to other systems described herein such as the system 100 of FIG. 1.

At 602, the method 600 includes providing an input prompt. A system operatively coupled to the processor (e.g., segmentation component 102) can receive the prompt.

At 604, the method 600 includes selecting N group segments, where N is a number of desired split segments. A system (e.g., segmentation component 102) can perform the selection of N group segments of the method 600.

At 606, the method 600 includes assigning unique scores to each group segment. A system (e.g., ranking component 106 and/or artificial intelligence component 214) can perform the assigning of unique scores of the method 600.

Figure 7:
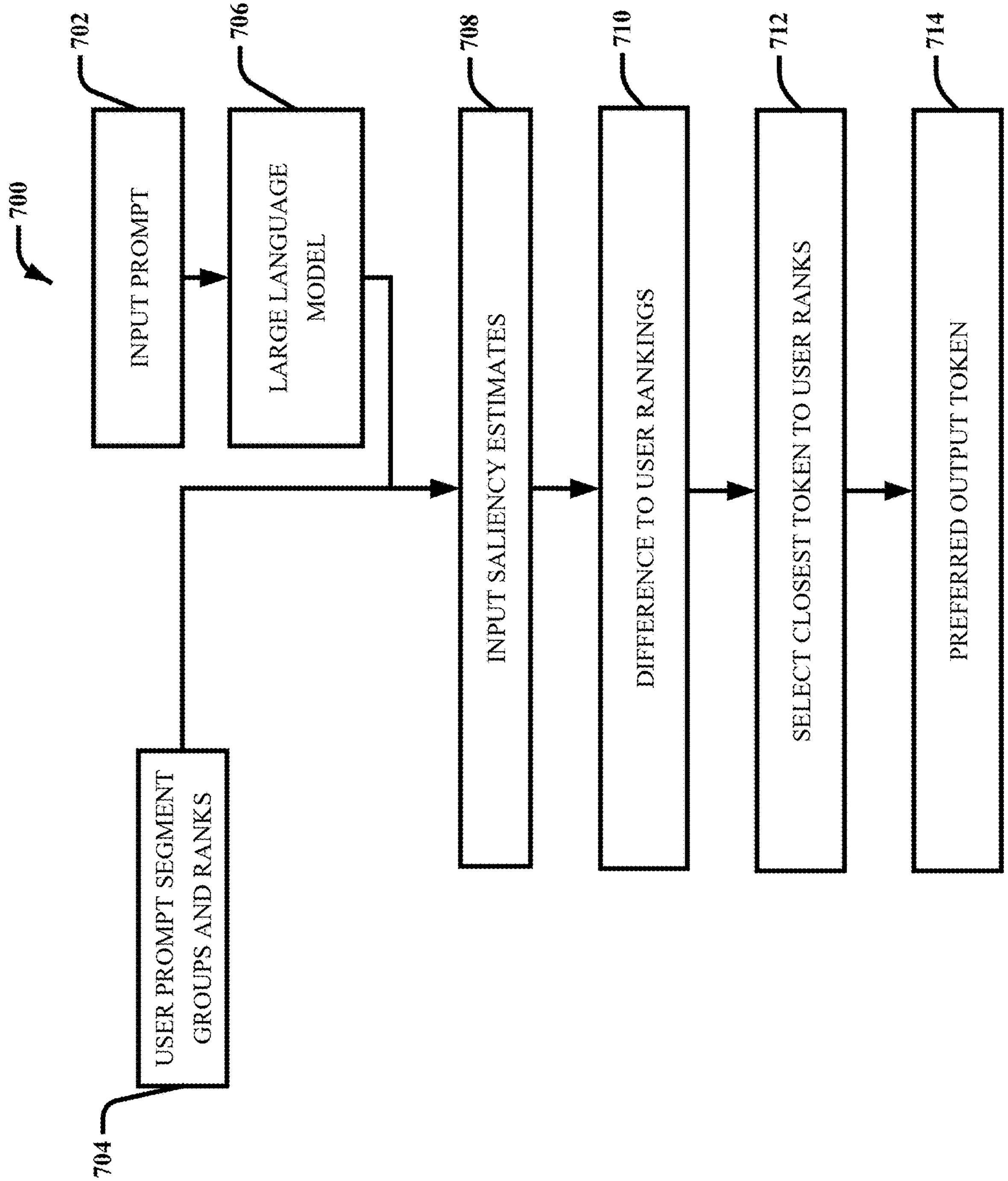

Next, FIG. 7 illustrates a flow diagram of a method 700 that can facilitate human guided decoding strategies for LLMs in accordance with some embodiments described herein, such as with the system 200 of FIG. 2 or the system 100 of FIG. 1. While the method 700 is described relative to the system 200 of FIG. 2, the method 600 can be applicable also to other systems described herein such as the system 100 of FIG. 1.

At 702, the method 700 includes receiving an input prompt. A system operatively coupled to the processor (e.g., segmentation component 102) can receive the prompt.

At 704, the method 700 includes segmenting the received prompt into groups and assigning ranks to the segmented groups. A system (e.g., segmentation component 102) can perform the segmentation. A system (e.g., ranking component 106 and/or artificial intelligence component 214) can also perform the ranking of the segmented groups. A user can utilize a system (e.g., segmentation component 102, ranking component 106, and/or artificial intelligence component 214) to perform the segmenting the received prompt into groups and assigning ranks to the segmented groups of the method 700.

At 706, the method 700 includes inputting the received prompt into a large language model. A system (e.g., artificial intelligence component 214) can provide the received prompt to a large language model.

At 708, the method 700 includes inputting saliency estimates. A system (e.g., ranking component 106 and/or artificial intelligence component 214) can perform the inputting saliency estimates of the method 700.

At 710, the method 700 includes determining a difference to user rankings. A system (e.g., ranking component 106 and/or artificial intelligence component 214) can perform the determining a difference to user rankings of the method 700.

At 712, the method 700 includes selecting a closest token to the user rankings. A system (e.g., selection component 212 and/or artificial intelligence component 214) can perform the selecting of a closest token to the user rankings of the method 700.

At 714, the method 700 includes outputting a preferred token. A system (e.g., selection component 212 and/or artificial intelligence component 214) can perform the outputting of a preferred token of the method 700.

Figure 8:
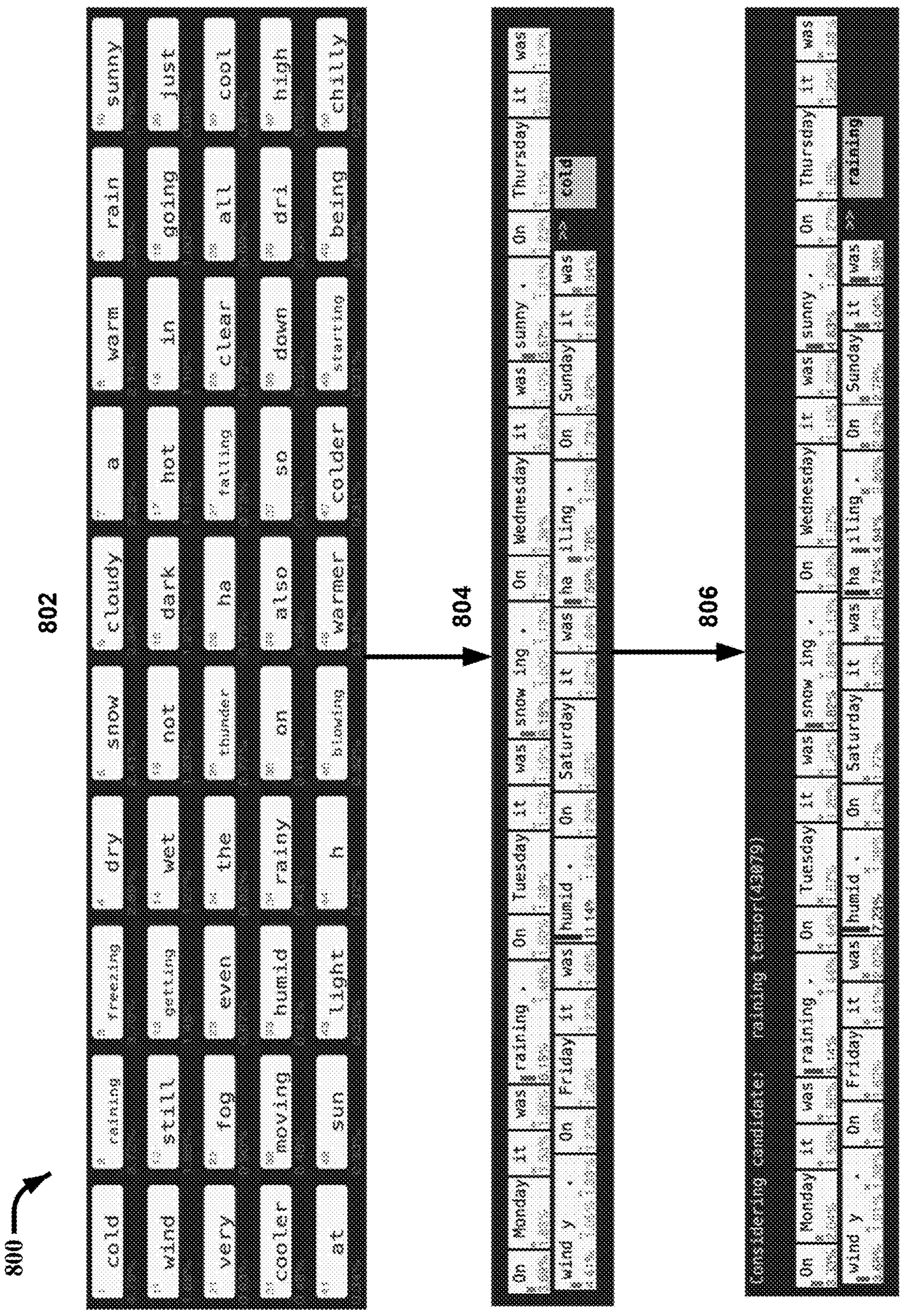
FIG. 8 illustrates an example implementation of one or more methods described herein that can facilitate human guided decoding strategies for LLMs in accordance with some embodiments described herein.

Next, FIG. 8 illustrates an example implementation 800 of one or more methods described herein that can facilitate human guided decoding strategies for LLMs in accordance with some embodiments described herein.

At 802, a system (e.g., the system 100 of FIG. 1 or the system 200 of FIG. 2) passes a received prompt through an LLM (e.g., the inputting 508 of a received prompt into a large language model of FIG. 5) and retrieves most likely candidate tokens (e.g., the determining 510 of likely candidate tokens from the input prompt of FIG. 5).

At 804, for each of the retrieved likely candidate tokens, the system analyses attention contributions to input tokens. The attention contributions can be calculated by inspecting hidden layers of the model. An Ecco library could be used to inspect the hidden layers and analyze the attention contributions. The system can compare the grouped attention contributions to a user-determined desired attention (e.g. comparing a group saliency estimate to the assigned unique scores 606 of FIG. 6).

At 804, the system can further determine a most likely token from the analyzed attention contributions.

At 806, the system can further determine a second most likely token from the analyzed attention contributions.

FIG. 9 and the following discussion are intended to provide a brief, general description of a suitable computing environment 900 in which some embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as iteratively updating the preliminary recovery plan until a failure-free recovery plan is developed with human guided text attention code 980. In addition to block 980, computing environment 900 includes, for example, computer 901, wide area network (WAN) 902, end user device (EUD) 903, remote server 904, public cloud 905, and private cloud 906. In this embodiment, computer 901 includes processor set 914 (including processing circuitry 920 and cache 921), communication fabric 911, volatile memory 912, persistent storage 913 (including operating system 922 and block 945, as identified above), peripheral device set 914 (including user interface (UI), device set 923, storage 924, and Internet of Things (IOT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method can be distributed among multiple computers and/or between multiple locations. On the other hand, in this presentation of computing environment 900, detailed discussion is focused on a single computer, specifically computer 901, to keep the presentation as simple as possible. Computer 901 can be located in a cloud, even though it is not shown in a cloud in FIG. 9. On the other hand, computer 901 is not required to be in a cloud except to any extent as can be affirmatively indicated.

PROCESSOR SET 910 includes one, or more, computer processors of any type now known or to be developed in the future. Processing circuitry 920 can be distributed over multiple packages, for example, multiple, coordinated integrated circuit chips. Processing circuitry 920 can implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set can be located "off chip." In some computing environments, processor set 910 can be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods can be stored in block 945 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory can be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 can be a read only memory (ROM), but typically at least a portion of the persistent storage allows writing of data, deletion of data and re-writing of data. Some familiar forms of persistent storage include magnetic disks and solid-state storage devices. Operating system 922 can take several forms, such as various known proprietary operating systems or open-source Portable Operating System Interface type operating systems that employ a kernel. The code included in block 945 typically includes at least some of the computer code involved in performing the inventive methods.

PERIPHERAL DEVICE SET 914 includes the set of peripheral devices of computer 901. Data communication connections between the peripheral devices and the other components of computer 901 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 can include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 can be persistent and/or volatile. In some embodiments, storage 924 can take the form of a quantum computing storage device for storing data in the form of qubits. In embodiments where computer 901 is required to have a large amount of storage (for example, where computer 901 locally stores and manages a large database) then this storage can be provided by peripheral storage devices designed for storing large amounts of data, such as a storage area network (SAN) that is shared by multiple, geographically distributed computers. IoT sensor set 925 is made up of sensors that can be used in Internet of Things applications. For example, one sensor can be a thermometer, and another sensor can be a motion detector.

NETWORK MODULE 915 is the collection of computer software, hardware, and firmware that allows computer 901 to communicate with other computers through WAN 902. Network module 915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and can take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 can be a client device, such as thin client, heavy client, mainframe computer and/or desktop computer.

REMOTE SERVER 904 is any computer system that serves at least some data and/or functionality to computer 901. Remote server 904 can be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data can be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs can be stored as images and can be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware and firmware allowing public cloud 905 to communicate through WAN 902.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1175 and private cloud 1176 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of some of the embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of some of the embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the “C” programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of some of the embodiments described herein.

Aspects of some of the embodiments described herein are described with reference to flowchart illustrations and/or block diagrams of methods, apparatus (systems), and computer program products according to some embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to some embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that some of the embodiments herein also can be implemented at least partially in parallel with one or more other program modules. Generally, program modules include routines, programs, components and/or data structures that perform particular tasks and/or implement particular abstract data types. Moreover, the described computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the various embodiments, but one of ordinary skill in the art can recognize that many further combinations and/or permutations of the various embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a processor that executes computer executable components stored in memory, wherein the computer executable components comprise:

a segmentation component that receives an input prompt and segments the input prompt into select groups based on saliency estimates determined from human annotated groupings of the input prompt;

a ranking component that assigns a rank to at least one of the select groups based on the saliency estimates and human annotated groupings; and a search component configured to:

generate a plurality of candidate tokens by processing the input prompt with a large language model;

determine a saliency estimate for each candidate token by analyzing attention contributions of the candidate token to tokens of the input prompt based on inspection of hidden layers of the large language model;

use the saliency estimate together with the human annotated groupings to calculate grouped saliency values associated with the select groups;

determine a distance between the grouped saliency values and a desired saliency calculation associated with the rank assigned to the at least one of the select groups;

search for a likely candidate token, based at least in part on the assigned rank, wherein the search component performs a first search that is rank-agnostic and a second search that is conditioned on the assigned rank; and select a most likely candidate token based at least in part on a comparison of results of the first and second searches during decoding of a large language-model output, thereby improving fidelity and relevance of generated text in response to user queries.

2. The system of claim 1, further comprising a selection component that determines a distance between the assigned rank and grouped saliency values associated with the select groups, and selects the most likely candidate token, based at least in part on a comparison of the grouped saliency values to a desired saliency calculation associated with the assigned rank.

3. The system of claim 2, wherein:

the search component performs a first search that is rank-agnostic based upon the received prompt, and performs a second search that is conditioned on the assigned rank; and the selection component selects the most likely candidate token based at least in part on a comparison of results of the first and second searches during decoding of a large language-model output.

4. The system of claim 1, further comprising an artificial intelligence component that trains an artificial intelligence model to calculate grouped saliency values from saliency estimates derived from attention contributions of candidate tokens.

5. The system of claim 4, wherein the artificial intelligence component ranks the saliency values based on a distance to a desired saliency decomposition associated with the human annotated groupings.

6. The system of claim 5 wherein the artificial intelligence component optimizes similarities between the grouped saliency values and the desired saliency calculation associated with the assigned rank.

7. The system of claim 1, wherein the rank assigned by the ranking component determines a desired saliency decomposition used to evaluate grouped saliency values derived from attention contributions of candidate tokens.

8. The system of claim 1, wherein the rank assigned by the ranking component determines a priority of the segmented groups for guiding selection of the most likely candidate token during decoding of the large language-model output.

9. The system of claim 1, wherein the ranking component adjusts the at least one rank and the search component performs a new search for a likely candidate token by performing updated rank-conditioned searching based on the adjusted rank.

10. A computer-implemented method that utilizes a processor that executes computer executable components stored in memory to perform the following acts:

segmenting a prompt into select groups based on saliency estimates determined from human annotated groupings of an input prompt;

assigning a rank to at least one of the groups based on the saliency estimates and the human annotated groups; and searching for a likely candidate token, based at least in part on the assigned rank, wherein the searching includes:

generating a plurality of candidate tokens by processing the input prompt with a large language model;

determining a saliency estimate for each candidate token by analyzing attention contributions of the candidate token to tokens of the input prompt based on inspection of hidden layers of the large language model;

using the saliency estimate together with the human annotated groupings to calculate grouped saliency values;

determining a distance between the grouped saliency values and a desired saliency calculation associated with the assigned rank;

and wherein the searching further includes performing a first search that is rank-agnostic and a second search that is conditioned on the assigned rank and selecting the most likely candidate token based at least in part on a comparison of results of the first and second searches during decoding of a large language-model output, thereby improving fidelity and relevance of generated text in response to user queries.

11. The method of claim 10, further comprising determining a distance between grouped saliency values and a desired saliency calculation associated with the assigned rank, and selecting the most likely candidate token based at least in part on minimizing the determined distance.

12. The method of claim 11, further comprising:

performing a first search that is rank-agnostic based upon the received prompt, and performing a second search that is conditioned on the assigned rank; and selecting the most likely candidate token based at least in part on a comparison of results of the first and second searches during decoding of the large language-model output.

13. The method of claim 10, further comprising training a large language model to calculate grouped saliency values for candidate tokens based on saliency estimates derived from attention contributions.

14. The method of claim 13, wherein the ranking of the saliency values is based on a distance to a desired saliency decomposition associated with human annotated groupings of the input prompt.

15. The method of claim 14, wherein further comprising using the distance to the desired saliency decomposition to determine a saliency cost for evaluating candidate tokens during decoding.

16. The method of claim 10, further comprising determining a desired saliency decomposition, based at least in part on the assigned rank and the human annotated groupings of the input prompt.

17. The method of claim 10, wherein assigning the rank determines a priority of the segmented groups for guiding selection of candidate tokens during decoding of the large language-model output.

18. The method of claim 10, further comprising adjusting the at least one rank and performing a new search for a likely candidate token by performing updated rank-conditioned searching based on the adjusted rank.

19. A computer program product comprising a computer readable storage medium having program instructions embodied therewith, the program instructions executable by a processor to cause the processor to:

segment a prompt into select groups based on saliency estimates determined from human annotated groupings of an input prompt;

assign a rank to at least one of the groups based on the saliency estimates and the human annotated groups; and search for a likely candidate token, based at least in part on the assigned rank, wherein the search includes:

generating a plurality of candidate tokens by processing the input prompt with a large language model;

determining a saliency estimate for each candidate token by analyzing attention contributions of the candidate token to tokens of the input prompt based on inspection of hidden layers of the large language model;

using the saliency estimate together with the human annotated groupings to calculate grouped saliency values;

determining a distance between the grouped saliency values and a desired saliency calculation associated with the assigned rank;

and wherein the search further includes performing a first search that is rank-agnostic and a second search that is conditioned on the assigned rank and selecting the most likely candidate token based at least in part on a comparison of results of the first and second searches during decoding of a large language-model output, thereby improving fidelity and relevance of generated text in response to user queries.

20. The computer program product of claim 19, further causing the processor to:

select a most likely candidate token, based at least in part on the assigned rank;

perform a first search that is rank-agnostic;

perform a second search that is conditioned on the assigned rank; and select the most likely candidate token based at least in part on a comparison of the results of the first and second searches during decoding of the large language-model output.

* * * * *